No. 642,038. Patented Jan. 23, 1900.
W. M. FRANK.
MARKER FOR SEEDING MACHINES.
(Application filed Apr. 3, 1899.)
(No Model.)
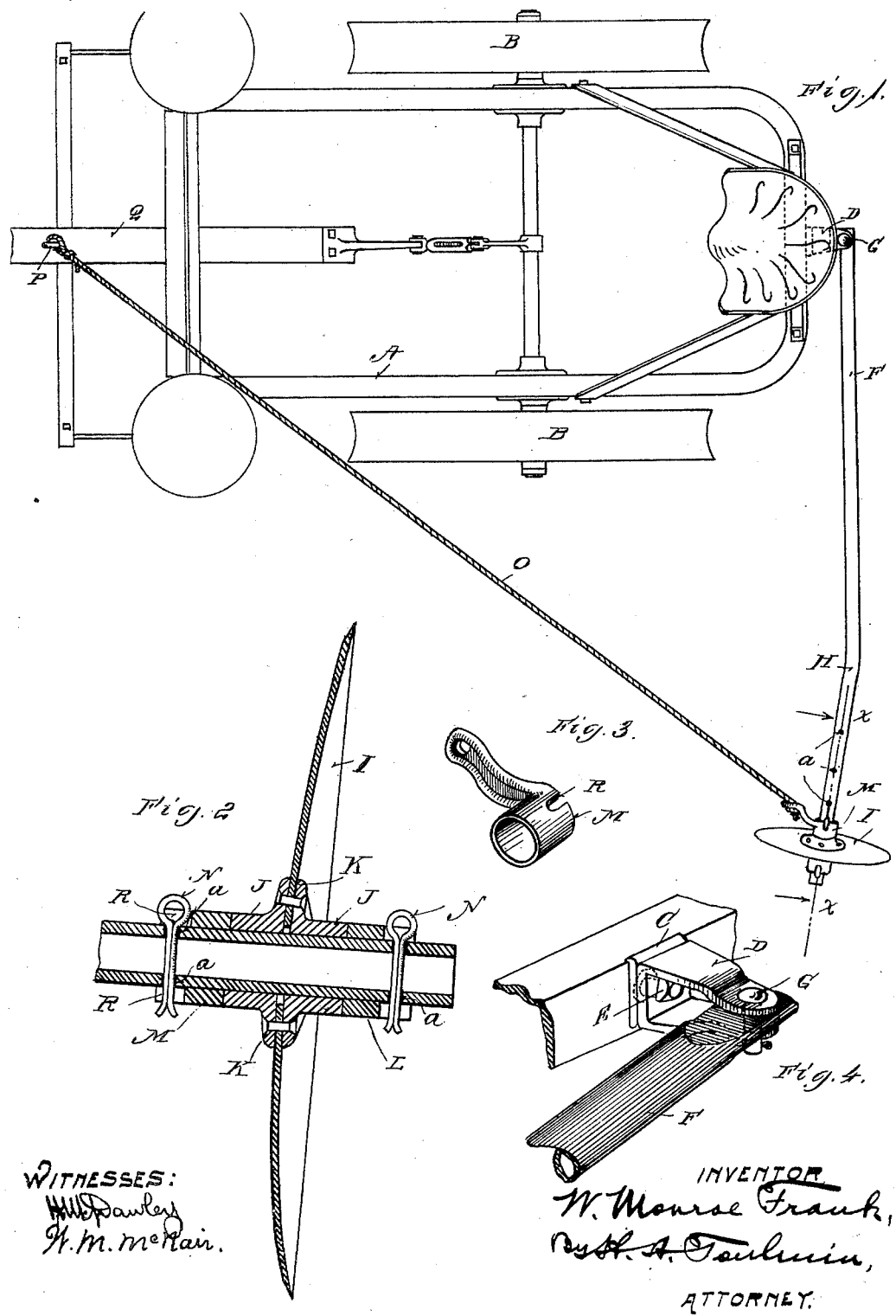

UNITED STATES PATENT OFFICE.

WILLIAM M. FRANK, OF SPRINGFIELD, OHIO.

MARKER FOR SEEDING-MACHINES.

SPECIFICATION forming part of Letters Patent No. 642,038, dated January 23, 1900.

Application filed April 3, 1899. Serial No. 711,511. (No model.)

*To all whom it may concern:*

Be it known that I, WILLIAM M. FRANK, a citizen of the United States, residing at Springfield, in the county of Clark and State of Ohio, have invented certain new and useful Improvements in Markers for Seeding-Machines, of which the following is a specification, reference being had therein to the accompanying drawings.

This invention relates to certain new and useful improvements in markers for seeding-machines, and is particularly adapted for use in connection with corn-planters.

The object of this invention is to provide a rotary-disk marker which is oblique to the line of travel and which may be used on each side of the machine to form a mark across the field by which the seeder may be guided on its return trip and whereby the marker, though in the soil sufficient to make a clear and distinct guiding-mark, will not run hard or will not catch or gather trash.

My invention further relates to details of construction hereinafter appearing and particularly pointed out in the claims.

In the accompanying drawings, on which like reference-letters indicate corresponding parts, Figure 1 is a plan view of this invention, shown applied to a corn-planter; Fig. 2, a sectional view on the line $x$ $x$ of Fig. 1; Fig. 3, a detail perspective view of the draft-arm, and Fig. 4 a detail perspective view of a portion of the frame and the manner of attaching these improvements thereto.

The letter A represents the frame of an ordinary corn-planter, and the letters B the carrying-wheels therefor. To the rear of the frame is secured a plate C, which slightly projects over the upper edge of the frame. A bracket D is secured to the plate C and frame A by means of a bolt E. The outer end of the bracket is bifurcated to receive a marker-rod F, which is pivotally held in place by means of a bolt G, passing through the bracket and marker-rod, as shown in Fig. 4. It will be observed that this rod is curved forward near its outer end, as shown at H. This is for the purpose of permitting the marking-disk, hereinafter described, to run at an angle to the line of travel of the machine.

On the outer end of the marker-rod F is mounted a disk I, preferably concave on one side and convex on the other, and which is adapted to rotate as the machine travels over the ground. In order to form a long bearing, the disk is provided with collars J, one on each side, which are fastened to the disk by means of rivets K or in any other suitable manner. To hold the disk in position on the gage-rod, I provide a collar L on one side and the draft-arm M, which fits on the marker-rod, on the opposite side. The collar L and the draft-arm are held in position by means of cotter-pins N, which pass through holes $a$ in the gage-rod. In order to cause the marking-disk to travel along with the seeder and to one side thereof, I provide a draft-rope O, which is secured to the draft-arm at one end and to an eyebolt P at its other end, which eyebolt is screwed into or bolted to the tongue Q of the seeder, as clearly shown in Fig. 1. Referring again to the draft-arm and collar L, it will be seen that each of them is notched, as shown at R. These notches are for the reception of the cotter-pins and prevent the necessity of drilling holes through the arm and collar for such cotter-pins, as these notches may be cast therein.

With these improvements a distinct furrow is made, which may be seen a long distance across the field, so that the operator is enabled to drive his seeder accordingly. In practice while the machine is planting or drilling the disk marker is furrowing or marking at one side or the other of the machine, and when the end of the row is reached the machine is turned around until the pole comes immediately over such furrow. While this change of position has been taking place, the operator has raised the marker from the ground and has turned it over until it projects beyond the opposite side of the machine in position for forming another furrow across the field as the machine is making its return-trip. In actual practice it has been found that where the disk has been set at an angle to the line of travel it will produce a much plainer mark, and consequently may be more readily followed. Then, again, where the marker is made to rotate it will ride over obstructions, such as hard lumps and stubble, the latter of which is of great practical importance, as it prevents the necessity of stopping in order to clean the marker, so that it will operate properly. It will also be understood that the inner end of the marker-rod is higher than the outer end when in marking position, so that the marking-disk is inclined to a vertical plane.

It is usual in this class of machines to provide for adjustment in order that the seed may be planted or divided in different widths or rows. This I have provided for by forming a number of holes *a* in the gage or marker rod, so that the collar L and draft-arm N may be moved along the rod, according to the adjustment of the width of rows, as above stated.

Having thus fully described my invention, what I claim as new, and desire to secure by Letters Patent, is—

1. In a marker for seeding-machines, the combination with a marker-rod connected with the main frame proper, of a marking-disk adjustable on said rod to different widths of rows and having a pair of collars secured thereto on opposite sides to constitute a bearing-sleeve, mounted thereon, a notched collar adapted to come in contact with one of said disk collars and a draft-arm adapted to come in contact with the other of said disk collars and means to secure said notched collar and said draft-arm to said rod, substantially as shown and described.

2. In a marker for seeding-machines, the combination with a marker-rod, of a draft-arm consisting of a sleeve and arm proper, the sleeve having a pair of notches therein, and adapted to be mounted on said rod, and a cotter-pin adapted to pass through said marker-rod and project within the notches of said draft-arm, substantially as shown and described.

In testimony whereof I affix my signature in presence of two witnesses.

WILLIAM M. FRANK.

Witnesses:
B. BLACKBURN ESTERLINE,
W. M. MCNAIR.